July 11, 1939.  A. NAGEL  2,165,409
FOCUSING MECHANISM FOR CAMERAS
Filed Dec. 24, 1937
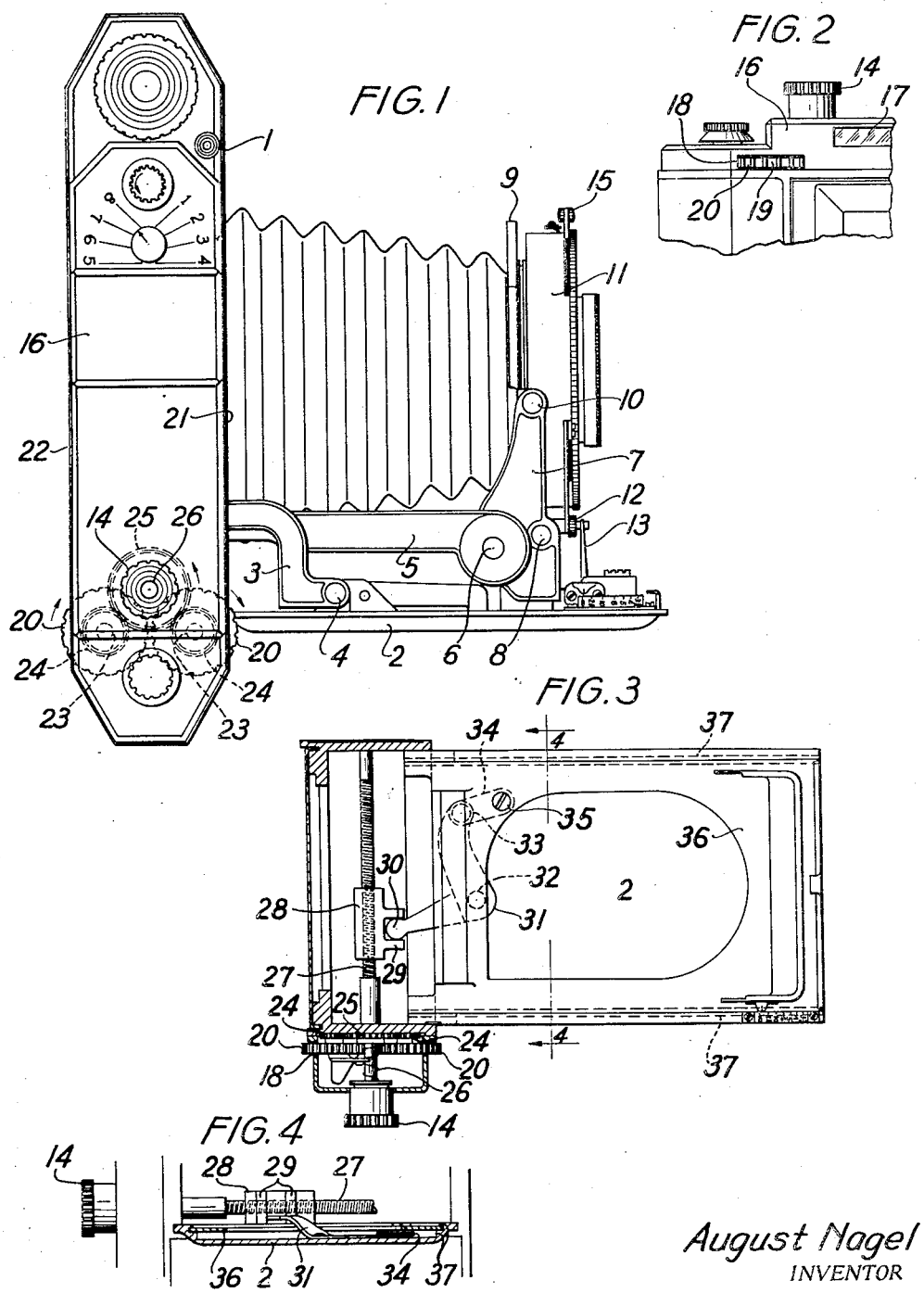
August Nagel
INVENTOR
BY
ATTORNEYS Patented July 11, 1939

2,165,409

UNITED STATES PATENT OFFICE 2,165,409

FOCUSING MECHANISM FOR CAMERAS

August Nagel, Stuttgart, Germany, assignor to Eastman Kodak Company, Rochester, N. Y., a corporation of New Jersey Application December 24, 1937, Serial No. 181,494

4 Claims. (Cl. 95—45)

This invention relates to photography and particularly to focusing cameras.

One object of my invention is to provide a focusing mechanism on the camera body which is adapted to focus a camera objective carried on a folding part of the camera. Another object of my invention is to provide a focusing mechanism comprising a plurality of focusing knobs, one particularly adapted for rapidly adjusting the camera objective toward the proper focal position and the others adapted to form a micrometer adjustment for accurately focusing the objective. Another object of my invention is to provide a focusing mechanism in the form of wheels revolubly mounted so as to project through slots in a camera body enabling an operator, by turning a projecting part of a wheel, to focus the camera while it is held at eye level. Still another object of my invention is to provide a camera body with means which can be readily grasped in different positions of the camera for adjusting the focus of a slide block type of camera and to provide folding mechanism between the camera body and the camera bed for connecting the focusing means with the camera slide block, and other objects will appear from the following specification, the novel features being particularly pointed out in the claims at the end thereof.

In folding cameras, and particularly in folding cameras employing a combined range finder and view finder which are held at eye level for both focusing and taking pictures, it is desirable to have a mechanism which can be readily operated while the camera is held in position for use. It is somewhat inconvenient to focus such a camera in the standard way by moving a focusing knob or lever on the camera bed and in order to avoid such awkward movement, I have provided a camera with a series of focusing dials which can be readily operated in almost any position, one of the dials being particularly adapted to quickly adjust the camera toward the proper position of focus and the focusing wheels being intergeared with the first-mentioned focusing member for a fine adjustment which can readily be made with a combined view and range finder or with a range finder alone.

Coming now to the drawing wherein like reference characters denote like parts throughout:

Fig. 1 is a side elevation of a camera focusing mechanism constructed in accordance with and embodying a preferred form of my invention.

Fig. 2 is a fragmentary detail elevation showing one end of the camera shown in Fig. 1.

Fig. 3 is a plan view, parts being shown in section, of the mechanism for moving the slide on the camera bed from the camera body.

Fig. 4 is a fragmentary detail, partially in section, of a portion of the focusing mechanism.

In accordance with the present embodiment of my invention, the camera may consist of a camera body portion 1, to which there is hinged a bed 2, the bed being movable from a folded closed position to the open or picture-taking position shown in Fig. 1. This bed may be supported by bed braces 3, pivotally attached at 4 to the camera bed and having a suitable connection with the camera body. The camera may or may not be of the self-erecting front type shown in Fig. 1. However, as shown in this figure, the braces 5, which are pivoted at 6 to the front uprights 7, which, in turn, are pivoted at 8 to the camera bed, are used for automatically erecting the camera front or lens board 9 in a known manner. The uprights 7 are pivoted at 10 to the lens board 9, and when the camera bed 2 is opened, the lens board 9 will be automatically positioned as shown in Fig. 1.

The lens board carries a shutter 11 which may be operated in the usual manner by a trigger 12, or this trigger may be connected, through a suitable linkage 13, to the knurled member 14, so that this member may be used for actuating the shutter as shown in U. S. application, Serial No. 165,358, Lindenberg, "Double exposure prevention camera" filed September 23, 1937, which has become Patent No. 2,139,759 of December 13, 1938. The shutter is preferably of the setting variety and a setting lever 15 is shown in Fig. 1. As thus far described, the camera may be of any standard construction, as long as it includes a camera body which supports a foldable front on which an objective is carried for focusing.

Coming now to the invention, the camera body 1 is provided with a housing on one side 16 which supports various parts of the camera operating mechanism, including a range finder, one window of which is shown at 17 in Fig. 2. This housing is slotted on each end at 18 to allow knurled portions 19 of the focusing wheels 20 to project a slight distance through the front wall 21 and the rear wall 22 of the camera as shown in Fig. 1. The wheels 20 are exactly alike and are pivotally supported inside of the housing 16 on the shafts 23, each of which carries a similar gear 24. The gears 24 mesh with a gear 25 carried by a shaft 26, which, in turn, carries the knob 14 which may be turned for focusing the camera or which may be depressed for actuating the shutter of the camera. The focusing movement of the camera is accomplished by means of the shaft 26 which carries a threaded portion 27 on which a nut 28 travels, this nut carrying a yoke 29.

In the end of the yoke, there is mounted one end 30 of a bell crank lever 31, pivoted at 32 to the camera bed 2, and having its opposite end 33 pivotally attached to a link 34, which, in turn, is pivoted at 35 to the slide 36.

This slide is mounted to move on the rails 37 carried by the bed, so that when the bell crank lever is moved, the slide moves on the bed rails. Thus, if it is desired to actuate the slide 36 quickly, or if the camera is held at waist level, the knurled button 14 is turned, turning the shaft 27 so that the nut will move on the thread and movement will be transmitted through the bell crank lever and link to the slide for focusing the camera objective.

The shaft 26 is intergeared with the two wheels 20 so that these wheels turn with the shaft 26. The wheels 20 are normally used to turn the shaft 26 through their gears, and it should be noted the direction of travel of these wheels. This direction is indicated by arrows in Fig. 1, and since the projecting parts of the two wheels are turned in opposite directions, it is a simple matter, by placing fingers on each side of the camera body, to adjust these wheels to very accurately focus the camera.

It is, of course, possible to select any desired gearing so as to vary the ratio of movement between the knob 14 and the two wheels 20. In the present instance, I have found it convenient to place a 36-tooth gear on the shaft 26 and to have this mesh with 18-tooth gears on the shafts 23 which support the focusing wheels 20. In this way, it is a comparatively simple matter to adjust the focus of the camera regardless of the position in which the camera is held. The focusing wheels 20 are particularly adapted for use in focusing the camera when it is held horizontally at eye level. If held vertically at eye level, it is much simpler to use the focusing knob 14.

It is often desirable to use both the focusing knob for a rough adjustment and the focusing wheels for a finer adjustment.

It should be noted from Fig. 4 that while the end of the bell crank lever 30 is normally engaged by the sides 29 of the fork, when the camera bed is swung about its hinge to close the camera, the parts remain in engagement so that there is no danger of accidentally displacing the bed when the camera is moved to a folded position.

I claim:

1. In a folding camera the combination with a camera body including front, back, side and end walls, of a front carrying an objective foldably and movably carried with respect to the camera body, said body including slots on opposite sides of a side wall of the camera, knurled wheels extending through said slots, gears carried by said wheels, a shaft carrying a gear meshing with the other two gears, and connections between said shaft and said objective for focusing the objective through movement of the wheels.

2. In a folding camera the combination with a camera body including front, back, side and end walls, of a front carrying an objective foldably and movably carried with respect to the camera body, said body including slots in opposite sides of a side wall of the camera, knurled wheels extending through said slots whereby an arcuate knurled edge projects from the camera wall, gears carried by each wheel, a third gear meshing with each of the said gears, a shaft carried by the third gear passing through said camera, a focusing knob carried by said shaft, the gearing being such that said knob may be used for quick adjustments and said wheels for fine adjustments, and operable connections between the shaft and the camera front for moving the latter by the former for focusing the objective.

3. In a folding camera the combination with a camera body including front, back, side and end walls, of a front carrying an objective foldably and movably carried with respect to the camera body, said body including slots in opposite sides of a side wall of the camera, knurled wheels mounted therein with knurled portions projecting therefrom, gears carried by the wheels, a shaft, a gear carried by the shaft, operable and foldable connections between the shaft and the movable camera front, said wheel gears and shaft gear being so connected that by moving that portion of the wheels projecting from the camera wall in opposite directions the shaft may be turned to focus the camera.

4. In a folding camera, he combination with a camera body having slots in one wall of the camera, of a bed hingedly attached thereto, an objective movably mounted on the bed for focusing, means for focusing the objective including a movable member operably connected at one end to the focusing device on the bed, an actuating device comprising three manually operable members, gearing connecting said members, one member being geared to move at a different speed from the other two members, said two members each partially projecting from the slots in the camera body whereby portions only are accessible, and connections between said gearing and the other end of the movable focusing member whereby all of said focusing members may move at the same time for focusing the camera.

AUGUST NAGEL.